United States Patent
Bavarian et al.

(10) Patent No.: US 7,987,877 B2
(45) Date of Patent: Aug. 2, 2011

(54) METHOD FOR MANAGING STORAGE OF GASEOUS HYDROGEN

(75) Inventors: Farshad Alexander Bavarian, Houston, TX (US); Dennis J. Benedetto, Spring, TX (US); John Michael Brady, Houston, TX (US); Daniel Glenn Casey, Kingwood, TX (US); Dean Alan Kenefake, Sugar Land, TX (US); Charles Franklin Perdue, Jr., Houston, TX (US); Hongqiao Bruce Sun, Sugar Land, TX (US)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 12/187,906

(22) Filed: Aug. 7, 2008

(65) Prior Publication Data
US 2009/0250138 A1 Oct. 8, 2009

Related U.S. Application Data

(63) Continuation of application No. 11/956,440, filed on Dec. 14, 2007, now abandoned.

(51) Int. Cl.
*B65B 31/00* (2006.01)

(52) U.S. Cl. ............. 141/5; 141/82; 141/83; 141/105; 141/236; 137/255; 137/256

(58) Field of Classification Search ............. 141/2–5, 141/82, 83, 94, 95, 98, 100–107, 192, 197, 141/234, 236, 248; 137/255, 256
See application file for complete search history.

(56) References Cited

U.S. PATENT DOCUMENTS

| | | | | |
|---|---|---|---|---|
| 5,409,046 | A * | 4/1995 | Swenson et al. | 141/11 |
| 5,673,735 | A * | 10/1997 | Crvelin et al. | 141/197 |
| 5,676,180 | A * | 10/1997 | Teel | 141/18 |
| 6,810,925 | B2 * | 11/2004 | Graham et al. | 141/98 |
| 7,128,103 | B2 * | 10/2006 | Mitlitsky et al. | 141/248 |
| 7,314,056 | B2 * | 1/2008 | Yamashita et al. | 137/255 |
| 7,325,561 | B2 * | 2/2008 | Mathison et al. | 137/256 |
| 7,415,995 | B2 * | 8/2008 | Plummer et al. | 141/197 |
| 2007/0079891 | A1 * | 4/2007 | Farese et al. | 141/94 |
| 2009/0151809 | A1 * | 6/2009 | Balasubramanian et al. | 141/3 |

* cited by examiner

*Primary Examiner* — Timothy L Maust
(74) *Attorney, Agent, or Firm* — Melissa Patangia; Christopher D. Northcutt

(57) ABSTRACT

In order to increase the hydrogen utilization rate of the cascade storage system, after dispensing gaseous hydrogen to a hydrogen vehicle, gaseous hydrogen is transferred via a compressor from at least one storage vessel at a lower pressure to at least one storage vessel at a higher, dispensable pressure. The methods of the present invention economically and efficiently increase the utilization rate of gaseous hydrogen stored in a cascade storage system by managing the storage of gaseous hydrogen and increasing the utilization rate of gaseous hydrogen stored in a cascade storage system.

15 Claims, 2 Drawing Sheets

METHOD FOR MANAGING STORAGE OF GASEOUS HYDROGEN

CROSS REFERENCE TO RELATED APPLICATIONS

This application is a continuation of U.S. patent application Ser. No. 11/956,440, filed Dec. 14, 2007 now abandoned, the entire disclosure of which is herein expressly incorporated by reference.

FIELD OF THE INVENTION

The present invention relates generally to methods for managing the storage of gaseous hydrogen and in particular to increasing the utilization rate of gaseous hydrogen stored in a cascade storage system.

BACKGROUND OF THE INVENTION

Hydrogen is utilized in a wide variety of industries ranging from aerospace to food production to oil and gas production and refining. Hydrogen is used in these industries as a propellant, an atmosphere, a carrier gas, a diluents gas, a fuel component for combustion reactions, a fuel for fuel cells, as well as a reducing agent in numerous chemical reactions and processes. In addition, hydrogen is being considered as an alternative fuel for power generation because it is renewable, abundant, efficient, and unlike other alternatives, produces zero emissions. While there is wide-spread consumption of hydrogen and great potential for even more, a disadvantage which inhibits further increases in hydrogen consumption is the absence of a hydrogen infrastructure to provide widespread generation, storage and distribution.

One way to overcome this difficulty is through the operation of hydrogen energy stations. At hydrogen energy stations, hydrogen generators such as reformers are used to convert hydrocarbons to a hydrogen rich gas stream. Hydrocarbon-based fuels, such as natural gas, LPG, gasoline, and diesel, require conversion processes to be used as fuel sources for most fuel cells. Current art uses multi-step processes combining an initial conversion process with several clean-up processes. The initial process is most often steam reforming (SR), autothermal reforming (ATR), catalytic partial oxidation (CPOX), or non-catalytic partial oxidation (POX), or combinations thereof. The clean-up processes are usually comprised of a combination of desulphurization, high temperature water-gas shift, low temperature water-gas shift, selective CO oxidation, selective CO methanation or combinations thereof. Alternative processes for recovering a purified hydrogen-rich reformate include the use of hydrogen selective membrane reactors and filters.

The gaseous hydrogen is then stored in stationary storage vessels at the hydrogen energy stations to provide inventory to fuel hydrogen vehicles. A cascade storage system is often used in the industry for dispensing gaseous hydrogen at hydrogen energy stations. The cascade storage system is divided into several storage banks of storage vessels. Several storage vessels with the same storage pressure are typically inter-connected to form one storage bank. In addition, several storage banks at different storage pressures are interconnected to form the cascade storage system. The cascade storage system has the ability to provide different consumers with different gas pressures in addition to increasing the utilization of the storage capacity.

Gaseous hydrogen is dispensed to hydrogen vehicles at a pressure of 5000 psi. In order to meet this requirement as well as the fast fueling requirement, gaseous hydrogen is typically stored in large quantities at pressures higher than the dispensing pressure. During the dispensing process, gaseous hydrogen is first withdrawn from the bank of storage vessels with the lowest pressure. Once the pressure of the vehicle tank of the hydrogen vehicle reaches that of the storage vessel, the gaseous hydrogen is next dispensed from the next bank of storage vessels at next higher pressure. This process continues until the vehicle tank of the hydrogen vehicle is full. The goal of the cascade storage system is to quickly and safely fill the hydrogen vehicle and to maximize the use of gaseous hydrogen.

Depending on the number of cascading storage levels, the hydrogen utilization rate is limited to about 35%-45% of the total onsite storage. The capital costs of retrofitting a storage system to achieve a utilization rate greater than 45% would not be economically viable due to the large number of valves in the system and the extra piping that would be required.

Another way to increase the utilization rate is to increase the number of cascading stages from the typical three stages to four, five, six, or any number of stages depending on the number of individual storage vessels that are available.

In addition, another way to increase the utilization rate is to increase the onsite storage pressure. Typically, to dispense at 5000 psi, the onsite storage pressure is approximately 6000 psi. In order to increase the utilization rate the onsite storage pressure can be increased to 6500 psi, 7000 psi, or higher. However, the cost of these high pressure vessels is high and availability is low.

The present invention addresses the desire to economically and efficiently increase the utilization rate of gaseous hydrogen stored in a cascade storage system.

SUMMARY OF THE INVENTION

In the present invention, methods for managing the storage of gaseous hydrogen are disclosed. The methods of the present invention increase the utilization rate of gaseous hydrogen stored in a cascade storage system.

A hydrogen energy station stores gaseous hydrogen in stationary storage vessels to provide inventory to fuel hydrogen vehicles. The design of the storage system is governed by the fundamental laws of thermodynamics for real gases such as hydrogen. In the present invention, in order to increase the hydrogen utilization rate of the cascade storage system, after dispensing gaseous hydrogen to a hydrogen vehicle, gaseous hydrogen is transferred via a compressor from one storage vessel at a lower pressure to another storage vessel at a higher pressure. This transfer will increase the capacity of gaseous hydrogen at higher pressures for dispensing to hydrogen vehicles and increase the utilization of the gaseous hydrogen.

BRIEF DESCRIPTION OF THE FIGURES

The description is presented with reference to the accompanying figures in which.

DETAILED DESCRIPTION OF THE INVENTION

The present invention discloses methods for managing the storage of gaseous hydrogen. The methods of the present invention increase the utilization rate of gaseous hydrogen stored in a cascade storage system. In order to increase the hydrogen utilization rate of the cascade storage system, after dispensing gaseous hydrogen to a hydrogen vehicle, gaseous hydrogen is transferred via a compressor from at least one storage vessel at a lower pressure to at least one storage vessel at a higher, dispensable pressure. The methods of the present invention economically and efficiently increase the utilization rate of gaseous hydrogen stored in a cascade storage system.

In terms of a hydrogen energy station, the cascade storage system stores gaseous hydrogen for the dispenser for dispensing gaseous hydrogen to hydrogen vehicles. The cascade storage system must maintain a certain storage capacity to be able to supply gaseous hydrogen to hydrogen vehicles for daily operation. If there is an onsite purified hydrogen generator to produce gaseous hydrogen for the cascade storage system, in order to avoid venting of gaseous hydrogen, the purified hydrogen generator only produces gaseous hydrogen when the storage capacity reaches the minimum level to sustain the hydrogen consumption. A high pressure compressor is used to pressurize the low pressure gaseous hydrogen from the purified hydrogen generator to the cascade storage system. When the purified hydrogen generator is not operating and thus the high pressure compressor is no longer being used by the purified hydrogen generator, the high pressure compressor instead can then be used to transfer gas in the lower pressure storage bank to a higher pressure storage bank which will increase the dispensable amount of gaseous hydrogen even when the purified hydrogen generator is not filling the cascade storage system. As a result, the present invention elevates the cascade storage system availability without extra external fueling of the cascade storage system.

A cascade storage system is divided into several storage banks of storage vessels. Several storage vessels with the same storage pressure are typically inter-connected to form one storage bank. In addition, several storage banks at different storage pressures are interconnected to form the cascade storage system.

After dispensing gaseous hydrogen to a hydrogen vehicle, there is always leftover gaseous hydrogen in each storage bank. This leftover gaseous hydrogen is below the useful pressure level for dispensing to hydrogen vehicles. This leftover gaseous hydrogen is only limited by the minimum suction pressure of the compressor. This leftover gaseous hydrogen in lower pressure storage bank vessels can be recompressed and transferred to higher pressure storage bank vessels thus increasing the capacity of gaseous hydrogen at higher pressures for dispensing to hydrogen vehicles.

Figure 1:
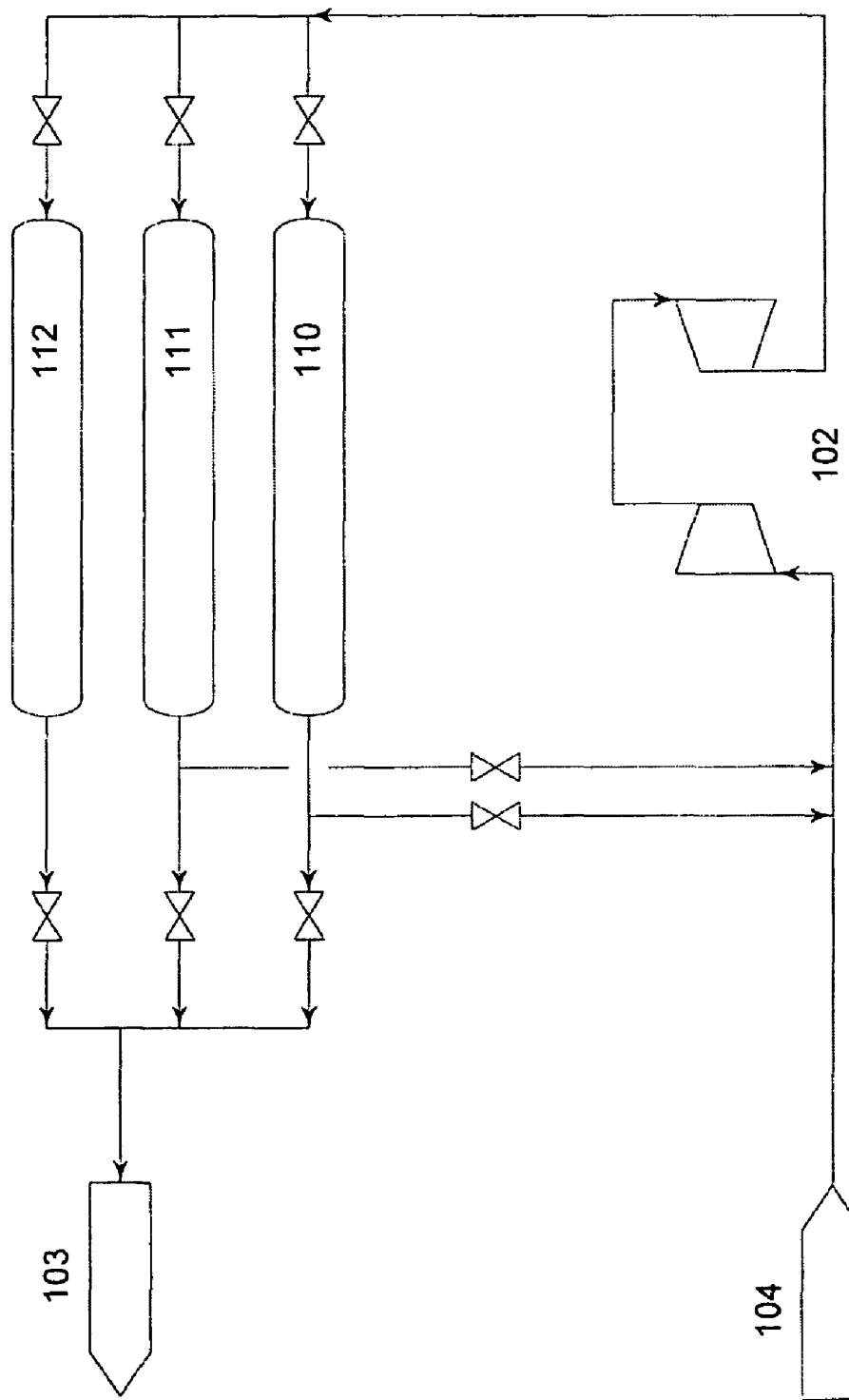
FIG. 1 depicts one embodiment of the methods of the present invention for managing the storage of gaseous hydrogen.

With reference to FIG. 1, FIG. 1 depicts one embodiment of the methods of the present invention for managing the storage of gaseous hydrogen. FIG. 1 depicts a hydrogen energy station 100 for the generation, storage and distribution of gaseous hydrogen. As shown in FIG. 1, the hydrogen energy station 100 includes a cascade storage system 101, a dispenser 103 for dispensing gaseous hydrogen to hydrogen vehicles, and a purified hydrogen generator (PHG) 104. The cascade storage system 101 includes a high pressure compressor 102, a plurality of stages of storage banks; a plurality of valves; and associated piping.

In the embodiment depicted in FIG. 1, the plurality of stages of storage banks includes a low storage bank 110 (corresponding to stage 1), a middle storage bank 111 (corresponding to stage n−1), and a high storage bank 112 (corresponding to stage n). The methods of the present invention as depicted in FIG. 1 require additional piping and valves as compared to a traditional cascade storage system in order to connect the dispensing side of the low storage bank 110 and the dispensing side of the middle storage bank 111 to the suction side of the high pressure compressor 102. The high pressure compressor 102 in turn routes the recompressed gaseous hydrogen to the high storage bank 112.

In addition, to maintain the suction side of the high pressure compressor 102 within the range of the operating parameters of the high pressure compressor 102 an appropriate regulating device should be installed in between the lines in between the plurality of stages.

In general, the dispensing side of any of the plurality of stages of storage banks up to stage n−1 may be routed to the suction side of the high pressure compressor 102. On the discharge side of the high pressure compressor 102, the priority sequencing fills cycle will determine which higher pressure storage bank will be filled first. Typically, the stage n storage bank will have first priority. The automatic control system of the gas control panel should be modified from the traditional settings to recognize the recompression process and stop the fills cycle when all of the receiving stages of the storage bank are filled to capacity.

In addition, as needed, the leftover gaseous hydrogen from the lower stage storage banks may be supplemented with the gaseous hydrogen generated onsite by the purified hydrogen generator 104 via the high pressure compressor 102. Also, gaseous hydrogen could be transported to the hydrogen energy station 100 from offsite (not illustrated) and introduced to the cascade storage system 101.

In one embodiment of the present invention, the high pressure compressor 102 is a two stage compressor. In another embodiment of the present invention, a separate single stage compressor (not illustrated) may be installed onsite and used for this supplemental filing of the lower stage storage banks.

Figure 2:
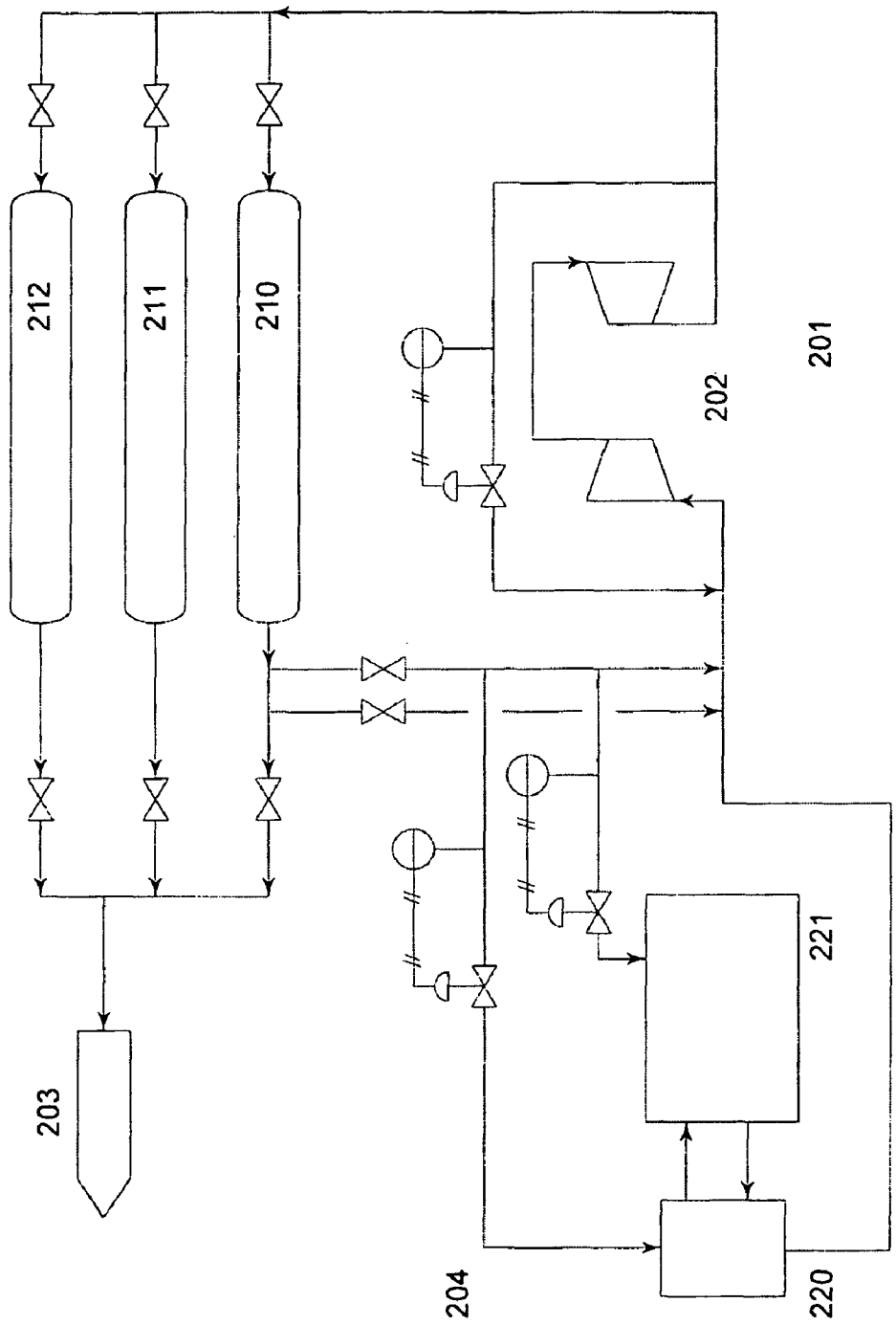
FIG. 2 depicts another embodiment of the methods of the present invention for managing the storage of gaseous hydrogen.

With reference to FIG. 2, FIG. 2 depicts another embodiment of the methods of the present invention for managing the storage of gaseous hydrogen. FIG. 2 depicts a hydrogen energy station 200 for the generation, storage and distribution of gaseous hydrogen. As shown in FIG. 2, the hydrogen energy station 200 includes a cascade storage system 201, a dispenser 203 for dispensing gaseous hydrogen to hydrogen vehicles, and a purified hydrogen generator (PHG) 204. The cascade storage system 201 includes a high pressure compressor 202, a plurality of stages of storage banks; a plurality of valves; and associated piping. The purified hydrogen generator 204 includes a pressure swing adsorption unit 220 and a hydrogen generator 221.

In the embodiment depicted in FIG. 2, the plurality of stages of storage banks includes a low storage bank 210 (corresponding to stage 1), a middle storage bank 211 (corresponding to stage n−1), and a high storage bank 212 (corresponding to stage n). The methods of the present invention as depicted in FIG. 2 require additional piping and valves as compared to a traditional cascade storage system in order to connect the dispensing side of the low storage bank 210 and the dispensing side of the middle storage bank 211 to the suction side of the high pressure compressor 202. The high pressure compressor 202 in turn routes the recompressed gaseous hydrogen to the high storage bank 212.

In one scenario of the embodiment depicted in FIG. 2, the low storage bank 210, the middle storage bank 211, and the purified hydrogen generator 204 may simultaneously feed the suction side of the high pressure compressor 202. This scenario increases the rate of available high pressure gaseous hydrogen and correspondingly increases the filling rate of the high storage bank 212.

In a second scenario of the embodiment depicted in FIG. 2, when the pressure of the gaseous hydrogen inside the low storage bank 210 falls below the suction pressure of the high storage bank 212, the gaseous hydrogen inside the low storage bank 210 can still be used to increase the net capacity of the cascade storage system 201.

In one option, the gaseous hydrogen inside the low storage bank 210 may be integrated with the pressure swing adsorption unit 220 and used during the purging/depressurization cycles.

In a second option, the gaseous hydrogen inside the low storage bank 210 may be used as an energy source within the purified hydrogen generator 204 by supplementing the pressure swing adsorption unit 220 off-gas with additional heating value.

While the methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A hydrogen cascade storage system method comprising:
   fueling a vehicle tank of a hydrogen vehicle with gaseous hydrogen from a cascade storage system comprising a plurality of stages of storage banks;
   refilling said plurality of stages of storage banks with leftover gaseous hydrogen contained within said plurality of stages of storage banks via a compressor by transferring said leftover gaseous hydrogen from said plurality of stages of storage banks with lowest pressure to said plurality of stages of storage banks with highest pressure; and
   transferring said leftover gaseous hydrogen from said plurality of stages of storage banks with lowest pressure to a pressure swing adsorption unit.

2. The method of claim 1 further comprising introducing additional gaseous hydrogen to said cascade storage system via said compressor to refill said plurality of stages of storage banks.

3. The method of claim 2 wherein said additional gaseous hydrogen is transported from offsite.

4. The method of claim 2 wherein said additional gaseous hydrogen is generated onsite by a purified hydrogen generator.

5. The method of claim 1 wherein said plurality of stages of storage banks comprises a stage 1 storage bank, a stage n−1 storage bank, and a stage n storage bank.

6. The method of claim 5 wherein fueling of said vehicle tank with said gaseous hydrogen begins with said stage 1 storage bank, proceeds to said stage n−1 storage bank, and conclude with said stage n storage bank.

7. The method of claim 6 wherein after fueling said vehicle tank with said gaseous hydrogen pressure of said stage 1 storage bank is less than pressure of said stage n−1 storage bank and pressure of said stage n−1 storage bank is less than pressure of said stage n storage bank.

8. The method of claim 7 wherein refilling said plurality of stages of storage banks with said leftover gaseous hydrogen begins by transferring said leftover gaseous hydrogen from said stage 1 storage bank to said stage n storage bank via a compressor.

9. The method of claim 8 further comprising introducing additional gaseous hydrogen to said cascade storage system to refill said plurality of stages of storage banks.

10. The method of claim 9 wherein said additional gaseous hydrogen is transported from offsite.

11. The method of claim 9 wherein said additional gaseous hydrogen is generated onsite by a purified hydrogen generator.

12. The method of claim 8 further comprising simultaneously feeding additional gaseous hydrogen to said compressor for transfer to said stage n storage bank.

13. The method of claim 1 further comprising introducing additional gaseous hydrogen to said cascade storage system via a separate compressor to refill said plurality of stages of storage banks.

14. The method of claim 13 wherein said additional gaseous hydrogen is transported from offsite.

15. The method of claim 13 wherein said additional gaseous hydrogen is generated onsite by a purified hydrogen generator.

* * * * *